Patented Feb. 10, 1948

2,435,831

UNITED STATES PATENT OFFICE 2,435,831

PROCESS OF OXIDATION OF ALKYL ESTERS OF ABIETIC ACID

Mortimer T. Harvey, South Orange, N. J., assignor to Harvel Research Corporation, a corporation of New Jersey No Drawing. Application February 12, 1944, Serial No. 522,156

6 Claims. (Cl. 260—99)

This invention relates to novel products and to methods for producing the same. More particularly this invention relates to novel methods of treating alkyl esters of abietic acid having between one to four carbon atoms in the alkyl group and to the novel products obtained thereby. The particular esters of abietic acid which I treat in a novel manner to obtain new and useful products are the alkyl esters of abietic acid having between 1 and 4 carbon atoms in the alkyl group and are methyl abietate, ethyl abietate, propyl abietate and butyl abietate.

The alkyl abietates may be readily prepared by first making up a mixture of a source of abietic acid, such as rosin, an alkyl alcohol having between 1 and 4 carbon atoms and a small proportion of a mineral acid. This mixture is boiled and maintained in the state of boiling under a reflux condenser for about 5 hours. Then the resultant mass is neutralized with an alkali, such as, a solution of potassium hydroxide in ethyl alcohol. This mass is then distilled to drive off the unreacted alcohol in the mixture and until the precipitation of salts becomes severe. Then to this mass containing said salts is added a quantity of ethyl alcohol and toluene in the ratio of about 1 to 1 to dissolve the mass. This solution is then washed with water to remove the salts and is then distilled to drive off the ethyl alcohol and toluene solvents. The remaining product is a viscous oil and is chiefly the alkyl ester of abietic acid and is the raw product employed in carrying out this invention.

In the course of my experimentations with said alkyl esters of abietic acid, I have discovered that novel and useful products may be obtained by treating them in a manner to which they had never been subjected prior to this invention. According to the present invention any one or a mixture of two or more of said esters is agitated at a temperature materially above room temperature in the presence of a gas containing free oxygen, and the agitation is continued until the viscosity of the material being treated is at least 50% greater than the viscosity of the untreated material and the combined oxygen content of the material being treated is at least 0.5% greater than the percentage of combined oxygen of the untreated material. In addition to these characteristics, the specific gravity of the treated material is higher than the specific gravity of the untreated material, the treated material has a lower solubility in mineral spirits when compared with the corresponding characteristic of the untreated material and the index of refraction of the treated material is greater than the index of refraction of the untreated material. In carrying out this process I prefer that the temperature of the ester subjected to said gas be above about 140° F. Although temperatures greatly in excess of 140° F. may be employed, I prefer to employ a temperature range of between about 140° F. to 400° F. notwithstanding that temperatures in excess of 400° F. such as 600° F. may be employed. While a wide variety of gases containing free oxygen may be employed, for the purposes of illustration, I disclose the use of air, oxygen or ozone, the former being the most preferable because of its availability and low cost. The agitation of the ester may be accomplished by flowing the material, by projecting the material or by forcing the gas itself through the material being treated.

One of the specific methods for producing said novel products, which method is particularly applicable commercially is to blow said alkyl esters at temperatures above 140° F. with a gas containing free oxygen. The blowing may be carried out by forcing said gas through the heated ester being treated, by allowing the heated ester being treated to trickle over inclined surfaces in the presence of said gas, or by forcing the heated ester being treated through an "atomizing" nozzle to break the mass into small particles which are projected into a chamber containing said gas. Any one of said specific methods may be employed alone or a combination of two or more of them may be used. This invention may be practiced at atmospheric or above atmospheric pressures. These specific methods are set forth merely for the purposes of illustration and show that variations of these particular methods may be used to obtain agitation and a high degree of surface contact of the abietate being treated to said gas so that the time of treatment may be such as to make the process commercially practicable. While the time of treatment is a variable depending upon the temperature of the ester being treated and the degree of surface contact of the ester and said gas per unit time, I prefer that the temperature of the ester be maintained above about 140° F. and the ester be treated with the free oxygen containing gas until the viscosity at 25° C. of the novel product be at least 50% greater than the viscosity at 25° C. of the untreated ester, that its percentage of combined oxygen be at least 0.5% greater than the percentage combined oxygen of the untreated ester, that the specific gravity of the novel product be 0.2% greater than the specific gravity of the untreated ester and that its solubility in mineral spirits to cloudiness be less than 75% of the solubility in mineral spirits to cloudiness of the untreated ester and that its index of refraction be greater than that of the untreated ester.

The novel products made according to this invention are capable of tackifying and of acting as plasticizers for cellulose ethers such as methyl cellulose, ethyl cellulose, propyl celluose, etc., natural rubber, reclaimed rubber, solid rubbery polymers of chlorbutadiene, solid rubbery polymers of butadiene, solid rubbery copolymers of butadiene and styrene, solid rubbery copolymers of butadiene and acrylonitrile. These novel products are also capable at elevated temperatures of forming a solution with solid polymerized vinyl compounds, which solution on cooling is a substantially non-bleeding gel at 70° F. which gel has a good tensile strength. Any one of the following solid polyvinyl compounds may be employed in the preparation of said gels: solid polyvinyl chloride, solid polyvinyl acetate, solid polyvinyl chloracetate, vinyl acetals such as solid polyvinyl butyral etc., and solid copolymers of vinyl chloride and vinyl acetate. These gels may also be employed to provide millable compositions with the cellulose ethers, natural rubber, reclaimed rubber or any one of the aforementioned rubbery polymers and copolymers. These novel products may also be employed with phenol-formaldehyde resins to improve their flexibility and impact strength. When so employed a quantity of fusible phenol formaldehyde resin may be mixed therewith and then the mix is cured.

The invention accordingly comprises the method and compositions of matter possessing the characteristics and properties, all of which will be exemplified in the following detailed disclosure, and the scope of the invention will be indicated in the claims. The following examples are given merely by way of further illustrating the invention and are not to be construed in a limiting sense.

*Example 1.*—A quantity of one of said alkyl esters of abietic acid having between 1 to 4 carbon atoms in the alkyl group is placed into a closed container having a conduit extending through the top thereof and terminating at a point spaced from but near the bottom thereof. The lower end of said conduit has a plurality of lateral openings therethrough, through which a free oxygen containing gas, such as air, oxygen or ozone may be discharged into said ester at places below the upper surfaces of said ester. The container has a vent located near the top thereof to release gas and is used to prevent great pressure being built up in said container and to allow the air, oxygen or ozone to circulate through said liquid. A stirrer is employed to constantly agitate said liquid throughout the entire operation thereby to increase the contact of the liquid with the air, oxygen or ozone. Throughout the entire operation, the liquid is maintained at a temperature between about 140° F. and 400° F., while the air, oxygen or ozone, admitted to said container may be at room temperature. The quantity of liquid in the container may be about one-quarter of the capacity thereof in order to accommodate the great deal of splashing due to the bubbling of the air, oxygen or ozone therethrough and the agitation due to stirring. After a period of between about 24 to 144 hours, depending upon the rate of stirring, the rate of air, oxygen or ozone admission and the quantity of said ester, the resultant product will be found to have increased in specific gravity, viscosity and combined oxygen content when compared with the respective corresponding characteristics of the ester before said operation was begun. After 144 hours the combined oxygen content will have increased at least 1% and in some cases will have increased as high as about 5%, the viscosity at 25° C. will have increased at least 50% and in some cases will have increased to such a degree that it has been converted to a mass which is semi-solid at 25° C.

*Example 2.*—A specific example of one of my novel products may be obtained by employing methyl abietate at a temperature of about 300° F. to 310° F. and allowing the methyl abietate to flow or cascade over a series of angularly disposed plates or pans with air being moved over the flowing abietate in a countercurrent direction. The following table shows the characteristics of the products produced at different intervals of this particular blowing operation.

| No. of hrs. at 305° F. (Methyl ester allowed to flow over series of pans with air in counter-current flow | Viscosity at 25° C. | | Specific Gravity | Solubility in mineral spirits to cloudiness in grams | Index of Refraction |
|---|---|---|---|---|---|
| | | Thinned with 25% Xylol | | | |
| | | Cp. | | | |
| 0 | 2,500 cp | 40 | 1.03 | 20 to 1 | 1.528 |
| 10 | 5,300 cp | 50 | 1.035 | 8 to 1 | 1.530 |
| 20 | 21,000 cp | 60 | 1.04 | 4 to 1 | 1.531 |
| 30 | too thick | 70 | 1.045 | 3 to 1 | 1.5325 |
| 40 | do | 80 | 1.05 | 2.3 to 1 | 1.5335 |
| 50 | very heavy | 104 | 1.06 | 1.8 to 1 | 1.535 |

The product produced at the end of this 50 hour treatment had a combined oxygen content of more than 3% greater than the corresponding characteristic of the methyl abietate.

*Example 3.*—1000 parts of ethyl ester of abietic acid was placed in an autoclave. Oxygen was forced into said autoclave and the temperature of the ester was increased to 140° F., with the pressure within the autoclave maintained at about 30 to 40 pounds per square inch by virtue of the addition of the oxygen under pressure. This mass was stirred rapidly for 24 hours while at said temperature and pressure. The specific gravity at 25° C. of the resulting product increased to 1.08 and its viscosity was more than 100% above that of the original ester.

*Example 4.*—1000 grams of the methyl ester of abietic acid was heated to 180° F. and maintained at this temperature in a closed vessel for 24 hours. During the entire period air was blown into said ester and the ester was stirred very rapidly. At the end of said 24 hour period, the finished product was approximately the same weight as the finished material, was almost a semi-solid in consistency and had a specific gravity at 25° C. of about 1.09.

Example 5.—1000 grams of the propyl ester of abietic acid was heated to 180° F. and maintained at this temperature in a closed vessel for 24 hours. During this entire period air was blown into said ester and the ester was stirred very rapidly. At the end of said 24 hour period, the finished product was approximately the same weight as the finished material, was almost a semi-solid in consistency and had a specific gravity at 25° C. of about 1.05.

Example 6.—1000 grams of the butyl ester of abietic acid was heated to 180° F. and maintained at this temperature in a closed vessel for 24 hours. During this entire period air was blown into said ester and the ester was stirred very rapidly. At the end of said 24 hour period, the finished product was approximately the same weight as the finished material, was almost a semi-solid in consistency and had a specific gravity at 25° C. of about 1.05.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

Having thus described my invention, what I claim and desire to protect by Letters Patent is:

1. The method comprising heating above about 140° F. a mass of an alkyl ester of abietic acid having between 1 to 4 carbon atoms in the alkyl group and while in said heated condition agitating said mass in the presence of a free oxygen containing gas until the viscosity of said mass at 25° C. has increased at least 50% and its specific gravity has increased.

2. The method comprising heating above about 140° F. a mass of an alkyl ester of abietic acid having between 1 to 4 carbon atoms in the alkyl group and while in said heated condition agitating said mass in the presence of a free oxygen containing gas until the viscosity of said mass at 25° C. has increased at least 100% and its combined oxygen content has increased at least 0.5% and its specific gravity has increased.

3. The method comprising heating between about 140° F. and 400° F. a mass of an alkyl ester of abietic acid having between 1 to 4 carbon atoms in the alkyl group and while in said heated condition agitating said mass in the presence of a free oxygen containing gas until the viscosity of said mass at 25° C. has increased at least 50% of said mass at 25° C. has increased at least 50% and its specific gravity has increased.

4. The method comprising heating between about 140° F. and 400° F. a mass of an alkyl ester of abietic acid having between 1 to 4 carbon atoms in the alkyl group and while in said heated condition agitating said mass in the presence of a free oxygen containing gas until the viscosity of said mass at 25° C. has increased at least 100% and its combined oxygen content has increased at least 0.5% and its specific gravity has increased.

5. The method comprising heating above about 140° F. a mass of methyl abietate and while in said heated condition agitating said mass in the presence of a free oxygen containing gas until the viscosity of said mass at 25° C. has increased at least 50%.

6. The method comprising heating between about 140° F. and 400° F. a mass of methyl abietate and while in said heated condition agitating said mass in the presence of a free oxygen containing gas until the viscosity of said mass at 25° C. has increased at least 100% and its combined oxygen content has increased at least 0.5%.

MORTIMER T. HARVEY.

REFERENCES CITED

The following references are of record in the file of this patent:

UNITED STATES PATENTS

| Number | Name | Date |
|---|---|---|
| 1,752,693 | Ramage | Apr. 1, 19__ |
| 2,154,704 | Schnorf | Apr. 18, 19__ |
| 2,265,161 | Hasselstrom et al. | Dec. 9, 19__ |
| 1,893,982 | Bradley | Jan. 10, 19__ |
| 1,083,168 | Whipple | Dec. 30, 19__ |

OTHER REFERENCES

"Abalyn," Hercules Naval Stores, office c__ dated Dec. 13, 1939 (4 pages).